United States Patent [19]

Hira

[11] Patent Number: 5,381,392
[45] Date of Patent: Jan. 10, 1995

[54] OPTICAL DISK REPRODUCING APPARATUS FOR IDENTIFYING WHETHER THE DISK IS A BLANK DISC, PARTICAL DISC, OR A FINALIZED DISK

[75] Inventor: Osamu Hira, Tokorozawa, Japan

[73] Assignee: Pioneer Electronic Corporation, Tokyo, Japan

[21] Appl. No.: 240,491

[22] Filed: May 10, 1994

Related U.S. Application Data

[63] Continuation of Ser. No. 50,547, Apr. 20, 1993, abandoned.

[30] Foreign Application Priority Data

Apr. 24, 1992 [JP] Japan .................................. 4-131575

[51] Int. Cl.⁶ .............................................. G11B 7/00
[52] U.S. Cl. ................................... 369/54; 369/58; 369/116
[58] Field of Search .............. 369/54, 48, 58, 44.26, 369/44.32, 53, 56, 50, 116

[56] References Cited

U.S. PATENT DOCUMENTS

| | | | |
|---|---|---|---|
| 4,989,195 | 1/1991 | Suzuki | 369/50 |
| 5,140,575 | 8/1992 | Fushiki | 369/44.28 |
| 5,289,451 | 2/1994 | Ashinuma et al. | 369/58 |
| 5,315,570 | 5/1994 | Miura et al. | 369/48 |
| 5,317,549 | 5/1994 | Maeda et al. | 369/58 |

*Primary Examiner*—W. R. Young
*Assistant Examiner*—Nabil Hindi
*Attorney, Agent, or Firm*—Kane, Dalsimer, Sullivan, Kurucz, Levy, Eisele and Richard

[57] ABSTRACT

An optical disc reproducing apparatus reproduces an optical disc having an information recording surface on which record information and control information are recorded. The apparatus is provided with: a device for rotationally driving the optical disc; a reading device for forming a light spot on the information recording surface, and receiving a reflected light to generate a read signal of the reflected light; a device for reproducing the record information and the control information from the read signal; a device for detecting whether a focus of the light spot is normal or not according to the read signal; a device for detecting whether a rotation number of the optical disc is normal or not according to the read signal; and a device for discriminating the optical disc on the basis of conditions of the detected focus and the detected rotation number.

13 Claims, 6 Drawing Sheets

OPTICAL DISK REPRODUCING APPARATUS FOR IDENTIFYING WHETHER THE DISK IS A BLANK DISC, PARTICAL DISC, OR A FINALIZED DISK

CROSS-REFERENCE TO RELATED APPLICATIONS

The present application is a continuation of application Ser. No. 08/050,547 filed Apr. 20, 1993, now abandoned.

BACKGROUND OF THE INVENTION

1. Field of the Invention

The present invention is related with an optical disc reproducing apparatus. Especially, it is related with an optical disc reproducing apparatus having means for discriminating an optical disc, such as a CD (Compact Disc), and a partial CD-R (CD Recordable) which is an optical disc of write once read many type in the middle of writing.

2. Description of the Related Art

There is a CD (Compact Disc) as an optical disc which records sound information etc. An example of such a CD is shown in FIG. 1.

Figure 1:
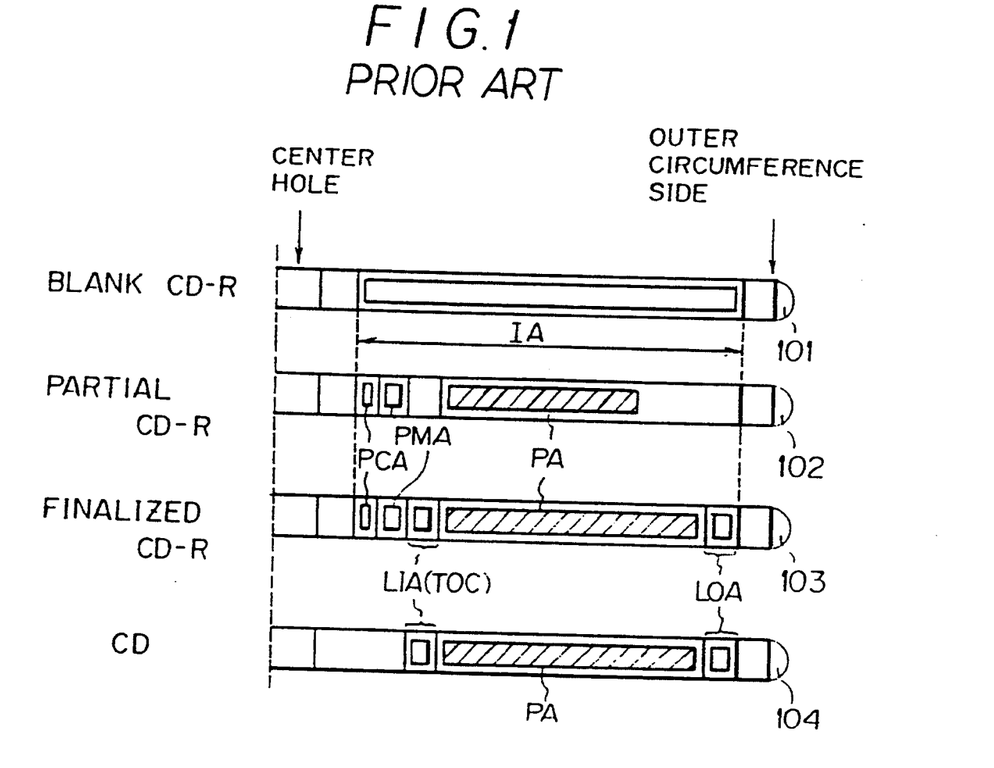
FIG. 1 is a diagram of formats of the CD-R in various states and the CD.

As shown in FIG. 1, in a CD 104, a lead in area LIA in which index information of the record information is recorded, a program area PA in which the actual music information etc. is recorded, and a lead out area LOA which indicates the end of the program area PA, are sequentially formed from the inner circumference of the disc of the CD 104.

The signal recorded on the optical disc is the digital signal modulated by EFM (Eight to Fourteen Modulation), which includes sub-codes, such as a time code (time information), other than main codes (main information), such as music information. Index information called TOC (Table Of Contents) is recorded in the lead in area LIA. The total number of the pieces of the record information recorded in the program area PA of the optical disc (for example, the total number of musics), the total recording time (for example, the total performance time), etc., are recorded as a sub-code in the index information. Music information etc. as a main code is recorded in the program area PA. In addition to this, the track number (TNO) which indicates the piece number of the record information (for example, music number), the recording time from the track start (P-TIME: for example, the performance time of the music), the total recording time measured from TNO=1 (A-TIME: for example, the total performance time), are recorded in the channel Q data of the sub-code. The lead out code which indicates it is the lead out area, is recorded in the lead out area LOA.

A CD player, which reproduces the record information on the above mentioned CD 104, is constituted to perform the following operation. Namely, when the CD is set, the CD player moves a pickup, which is an optical head, to a predetermined initial position. After this, it performs a set up (SET-UP) to be in the state where the information reading is possible, by rotating the CD. When the set up is completed, it reads the TOC information from the lead in area LIA. Generally, the access information such as a track number (TNO) of the information record piece, which is recorded in the program area PA, is included in the TOC information, so that the access control of the indicated information is performed by storing the access information.

By the way, the CD which has a record format mentioned above, is a record medium only for reproduction. However, a CD-R, which is a recordable optical disc of write once read many type, to enable writing of information, while employing the same format as the CD, is desired.

The record format standard of this CD-R is unified by the standard so called "orange book", which is based on the CD format standard (which is called "red book").

As shown in FIG. 1, the disc of this CD-R, is classified into three categories (CD-R 101 to 103), according to the recording state, as following.

(1) A blank disc i.e. a CD-R 101 in FIG. 1, which is in the non-recorded state where information is not yet recorded (it is referred as a "blank CD-R", hereinbelow).

(2) A disc i.e. a CD-R 102 in FIG. 1, which is in the middle of writing, where information is partially recorded (Partially Recorded disc, which is referred as a "partial CD-R", hereinbelow).

(3) A disc i.e. a CD-R 103 in FIG. 1, which is finished with writing and finally formatted to have the almost same format as the CD 104 after completing recording (Finalized Disc, it is referred as a "finalized CD-R", hereinbelow).

As shown in FIG. 1, in the finalized CD-R 103, the lead in area LIA, the program area PA and the lead out area LOA, are formatted in the same manner as the CD 104.

Information record and reproduction are generally performed by the recording and reproducing apparatus for the exclusive use with respect to the CD-R. The guiding groove is formed at the record track of the CD-R. This guiding groove is wobbled by the frequency which is generated by FM-modulating the conveyance wave by the data which indicates an absolute time (ATIP: Absolute Time In Pregroove).

The recording and reproducing apparatus of the CD-R is constituted to control the record and reproduction with respect to the blank CD-R and the partial CD-R in the middle of writing, while carrying out the track and spindle control by use of the guiding groove. As shown in FIG. 1, the PMA (Program Memory Area) as a domain of a temporary TOC which stores the record history of the record information LIA, is prepared in the inner circumference of the lead in area of the partial CD-R 102. The PCA (Power Calibration Area) to perform trial writing, in order to obtain a suitable record laser power for each disc, is also prepared in the inner circumference.

Three kinds of information is recorded in the PMA, as following.

Firstly, the start address and end address etc., of the record information recorded in the program area, are recorded. These are recorded by use of the same format as the TOC information recorded in the lead in area of the CD 104.

Secondly, the disc distinguishing information (option) is recorded, to which numeral information of 6 figures (6 digits) for disc distinguishing, is recorded depending on the necessity.

Thirdly, skip command information and skip canceling information are recorded, which are constituted to skip each record area indicated by the TNO specified at the time of disc reproduction, or a portion (time specification is possible) of the record area indicated by the TNO.

In this manner, the reason why the information as a temporary TOC is recorded to the PMA in the partial CD-R, is that the TOC information cannot be recorded to the lead in area until the record completion (finalization) is finally directed, since there is a possibility that information may be added to be written into the remaining program area. For this reason, the partial CD-R is kept in such a state that no information is written in the lead in area and the lead out area. Therefore, each area has remained in the mirror surface finished state. In order to finally make the format of the CD-R same as that of the CD by directing the finalization, the recording and reproducing apparatus of the CD-R records the predetermined information and the TOC information recorded in the PMA to the lead in area, as the sub-code. The recording and reproducing apparatus of the CD-R also records to the lead out area, the predetermined information indicating the area, as the sub-code. Accordingly, in the CD player, the reproduction of the finalized CD-R is made possible.

In this manner, the CD-R of write once read many type is provided. However, though the finalized CD-R can be reproduced in the ordinary CD player exclusive for the CD reproduction, the information in the partial CD-R on which the information is recorded up to the middle thereof, is not constituted to be reproduced by the CD player, although the reproducible information is stored in the program area thereof. This is because the CD player does not have the mechanism for accessing the PMA, although the TOC information is recorded in the PMA provided in the inner circumferential side of the lead in area in the partial CD-R, as mentioned above. The conventional CD player is not adapted to cope with the reading control of such a partial CD-R, so that a servo-control system thereof may run recklessly if it reads the lead in area and lead out area since these areas are still in the mirror surface finished state, a servo-control system may run recklessly if the conventional CD player reads these areas. The correspondence of reading control was not made in this manner.

As a countermeasure of this, it may be proposed to construct a CD player to have a mechanism to access the PMA, and mechanism for reading the guiding groove and controlling the tracking and spindle, as in the case of the CD-R recording and reproducing apparatus. However, it is not preferred in an economical sense relative to the effect, to provide such mechanisms only for the partial CD-R.

In case that the partial CD-R is reproduced by the CD player, the discrimination of the disc becomes necessary. The applicant of the present invention, has proposed a method of discrimination in the prior application (Japanese Patent Application Hei No.3-21205). However, by this discrimination method, it becomes necessary to provide a mechanism to detect the wobbling frequency of the guide groove, and the discrimination of the partial CD-R and the blank disc cannot be performed unless it performs an access until the most outer circumference in order to detect the RF signal from the inner circumference to the outer circumference of the optical disc.

SUMMARY OF THE INVENTION

It is therefore an object of the present invention to provide an optical disc reproducing apparatus, which can discriminate a partial CD-R in the middle of writing and can reproduce the program area thereof by a change merely in control, without mechanically adding an element.

According to the present invention, the above mentioned object can be achieved by an optical disc reproducing apparatus for reproducing an optical disc having an information recording surface on which record information and control information are recorded. The apparatus is provided with: a device for rotationally driving the optical disc; a reading device for forming a light spot on the information recording surface, and receiving a reflected light to generate a read signal of the reflected light; a device for reproducing the record information and the control information from the read signal; a device for detecting whether a focus of the light spot is normal or not according to the read signal; a device for detecting whether a rotation number of the optical disc is normal or not according to the read signal; and a device for discriminating the optical disc on the basis of conditions of the detected focus and the detected rotation number. Thus, the driving device, the reading device and the reproducing device can be controlled to operate a reproduction operation corresponding to the discriminated optical disc.

The nature, utility, and further features of this invention will be more clearly apparent from the following detailed description with respect to preferred embodiments of the invention when read in conjunction with the accompanying drawings briefly described below.

DETAILED DESCRIPTION OF THE PREFERRED EMBODIMENTS

Hereinbelow, with reference to the drawings, embodiments of the present invention will be explained.

Figure 2:
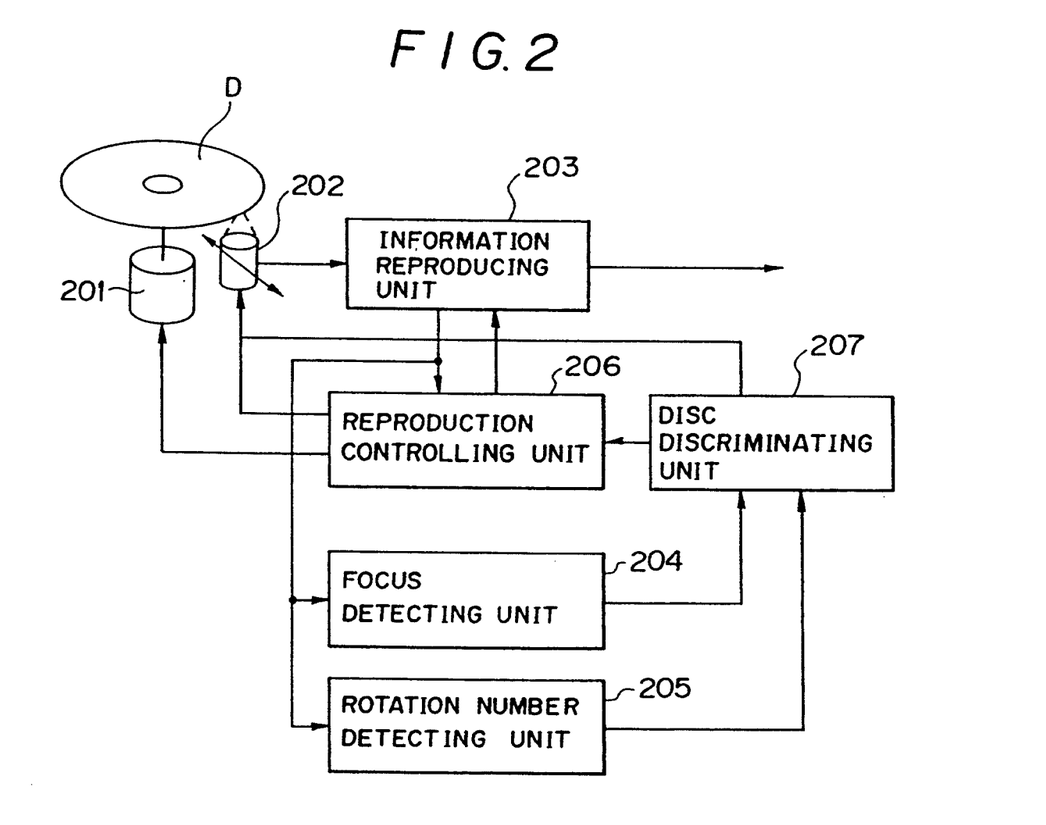
FIG. 2 is a block diagram showing the basic principle of the present invention.

In FIG. 2, an optical disc reproducing apparatus includes a rotationally driving unit 201, a reading unit 202, an information reproducing unit 203, a focus detecting unit 204, a rotation number detecting unit 205, a reproduction controlling unit 206 and a disc discriminating unit 207.

The rotationally driving unit 201 rotationally drives an optical disc D. The reading unit 202 irradiates a light spot onto an information recording surface of the optical disc D, and generates and outputs read signal of record information by a reflected light. The information reproducing unit 203 reproduces the record information and the control information from the read signal. The focus detecting unit 204 detects whether the focus of the light spot is normal or not according to the read signal. The rotation number detecting unit 205 detects whether the rotation number of the optical disc normal or not according to the read signal. The reproduction controlling unit 206 controls the reproduction by operating the rotationally driving unit 201 and the reading unit 202. The disc discriminating unit 207 performs a discrimination of the optical disc on the basis of conditions of the focus and the rotation number of the optical disc.

In FIG. 2, for example, at the time of starting the record and reproduction of the record information of the optical disc D, the initial set up in which the reading position of the reading unit 202 is moved to an initial position and the reading unit 202 and the rotationally driving unit 201 are operated by the reproduction controlling unit 206. In this initial set up, the disc discriminating unit 207 performs the discrimination with respect to the optical disc D to be reproduced, on the basis of the detection information by the focus detecting unit 204, and the rotation number detecting unit 205. Namely, if the focus is not normal i.e. settled, it is discriminated as a sub-standard disc, for example, which is scratched or dust-attached, or which is set upside down to the reproducing apparatus. Alternatively, if the both of the focus and the rotation number are normal, it is discriminated as a standard optical disc.

And, if the rotation number is not normal in this discrimination, it is discriminated as a sub-standard optical disc. In this case, for example, the reading position of the reading unit 202 is moved into the program area, and the discrimination is further prosecuted. Namely, at the position after movement, the set up is started by the reproduction controlling unit 206, and the discrimination with respect to the optical disc D to be reproduced is prosecuted by use of the focus and the rotation number in this case. In this discrimination, if the focus is not settled, it is discriminated as a sub-standard disc. If the rotation number is not normal, it is discriminated, for example, as a blank CD-R, to which no information is recorded. And, if both of the focus and the rotation number are normal in this discrimination, it is discriminated as a disc, to which the information is recorded in its program area, so that the information reproduction of the program area can be performed.

In this manner, in the present invention, since the optical disc is discriminated by use of the focus and the rotation number of the optical disc, the partial CD-R etc, which has a format unable to perform the set up at the initial position, for example, and to which the information is recorded in its program area, can be reproduced without adding a special mechanical element.

Figure 3:
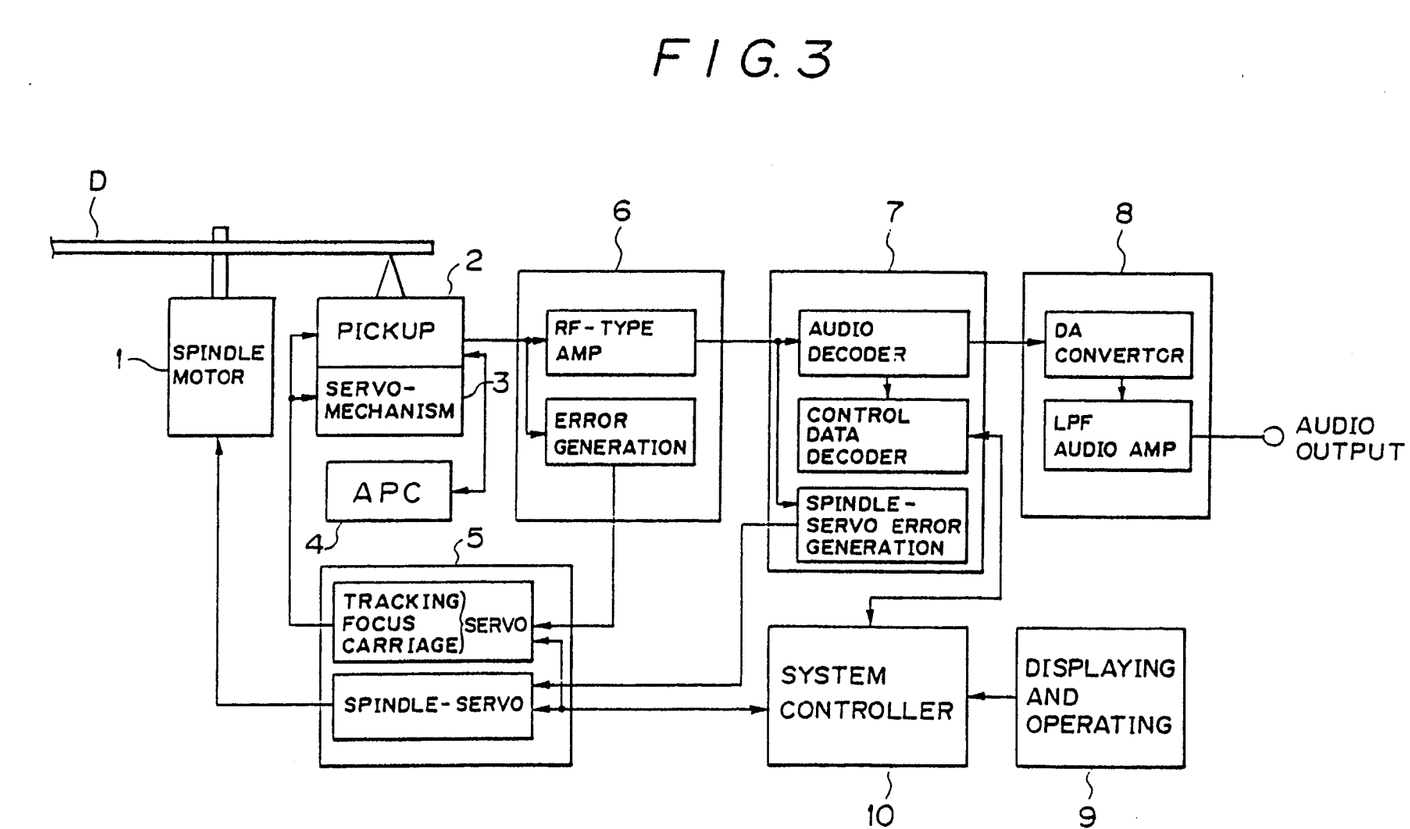
FIG. 3 is a block diagram of a CD player to which the present invention is applied.

FIG. 3 shows a block diagram of a CD player as one embodiment of the present invention.

As shown in FIG. 3, the CD player to which the present invention is applied, is provided with a spindle motor 1, a pickup 2, a servo-control mechanism 3, an auto power controller 4 (APC), a servo-control section 5, a preamplifier section 6, a decoder section 7, a D/A converter section 8, a display and operation section 9, and a system controller section 10.

The spindle motor 1 rotationally drives an optical disc D. The pickup 2 reproduces a RF (Radio Frequency) signal by irradiating a laser spot onto the pit on the disc D, and photo-electric-converting the reflective light. The servo-control mechanism 3 moves the pickup 2 in the radial direction of the disc D, and performs positioning to the track. The auto power controller (APC) 4 keeps the output of the laser light of the pickup 2 constant. The servo-control section 5 servo-controls the spindle motor 1, the pickup 2, and the servo-control mechanism 3. The preamplifier section 6 amplifies the RF signal reproduced from the pickup 2, and generates the servo-control signal to the servo-control section 5. The decoder section 7 performs the signal processes, such as an EFM recovery process, an error correction, etc. of the amplified RF signal, and reproduces audio data. And, the decoder section 7 reproduces control data from the sub-coding, and generates the servo-control signal for the spindle servo-control. The D/A converter section 8 carries out the D/A conversion of the audio data generated by the decoder section 7, and generates an audio output. A display and operation section 9 is an apparatus for displaying a state of operation etc. and for inputting the operation indication. The system controller section 10 consists of a microprocessor, a memory, etc., and controls the whole apparatus.

Figure 4:
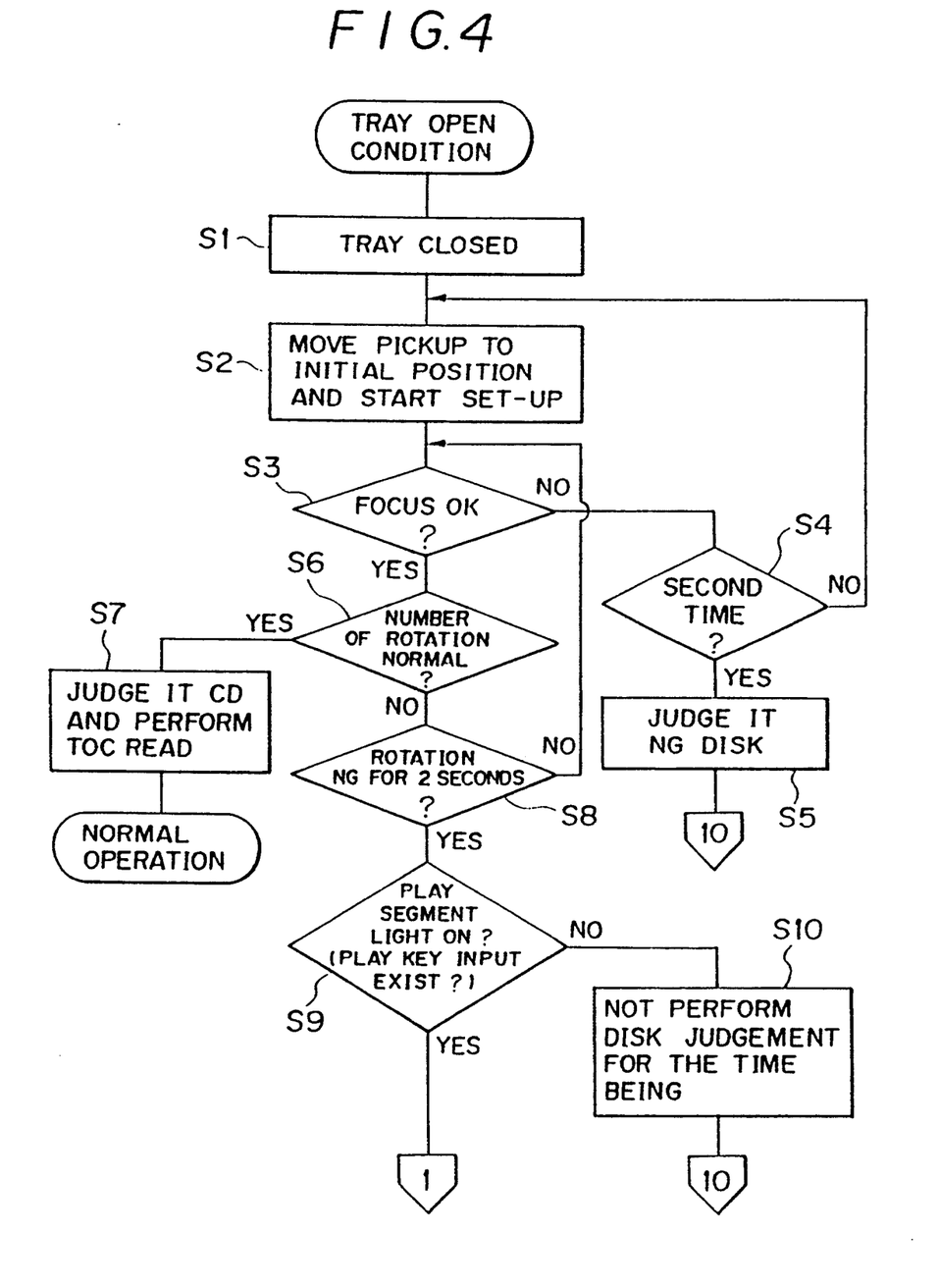
FIG. 4 is a process flow chart of an initial set up of a system controller section in an embodiment.
Figure 5:
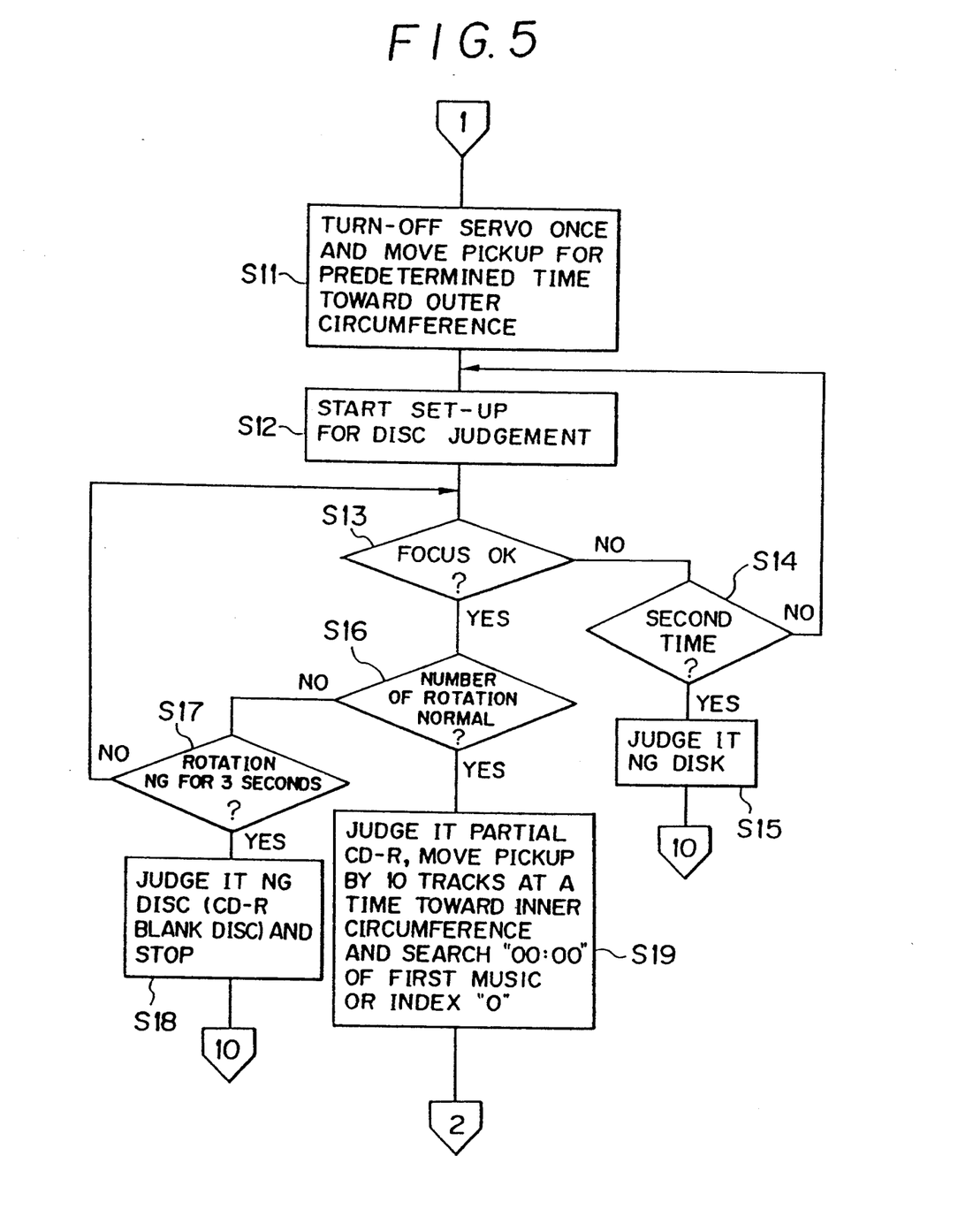
FIG. 5 is a process flow chart of disc judgement of the system controller section in the embodiment.
Figure 6:
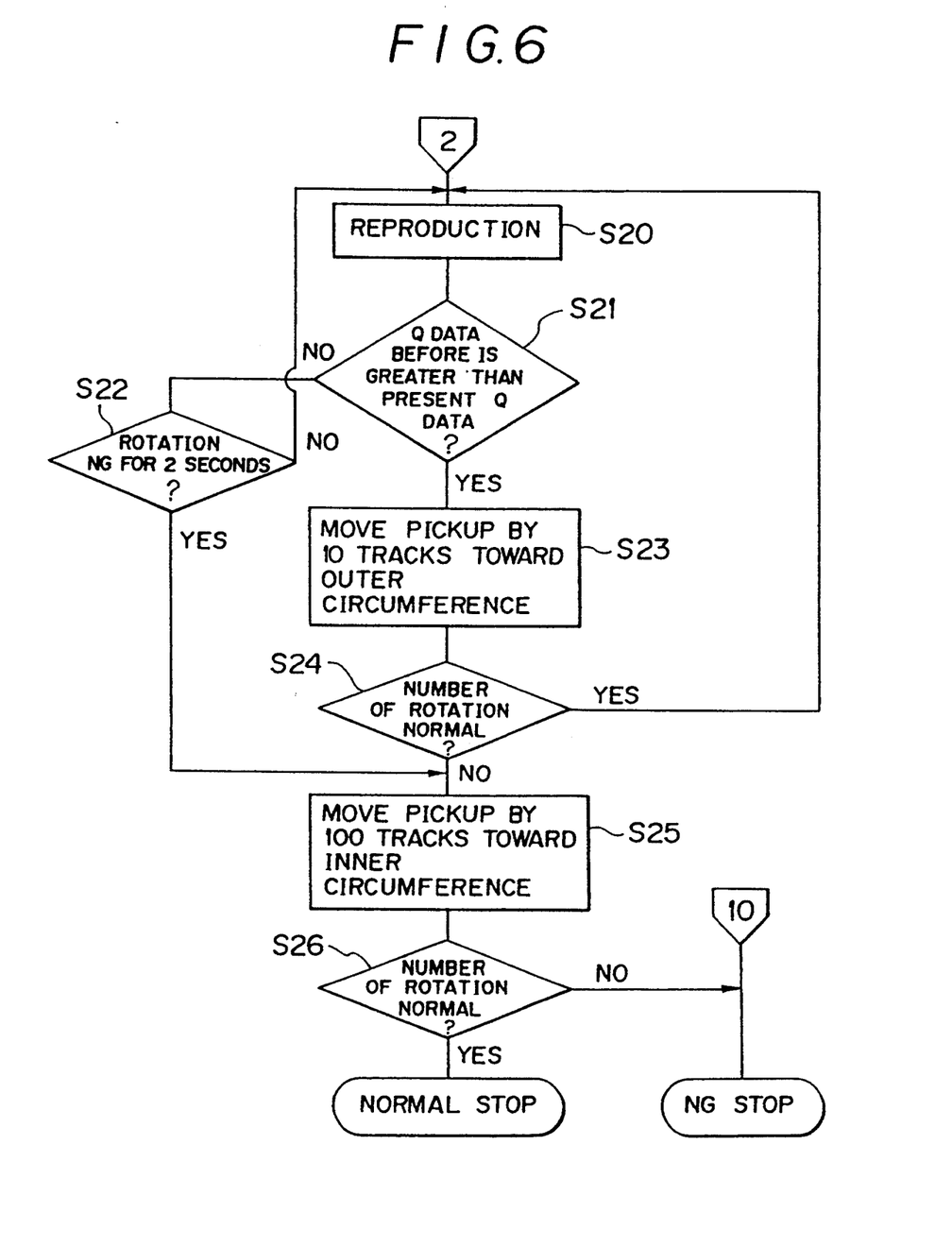
FIG. 6 is a process flow chart of a reproduction finish of the system controller section about the reproduction of the partial CD-R of the embodiment.

FIG. 4 to FIG. 6 show the process flow charts about the reproduction control of the disc D by the system controller section 10, which operates as the disc discriminating unit and the reproduction controlling unit. The CD player of the present embodiment is constituted so that, when the partial CD-R is set thereto, the CD player may discriminate it as a CD exclusive for reproduction and reproduce the record information on the program area of it. FIG. 4 to FIG. 6 show mainly the flow charts indicating the control process of the system controller section 10 in the reproduction of the partial CD-R.

According to the flow charts shown in FIG. 4 to FIG. 6, the reproduction controlling process of the system controller section 10 will be explained in sequence, which operates as the disc discrimination unit and the reproduction controlling unit. FIG. 4 shows the initial set up right after setting the disc D and the first discrimination process with respect to the disc D. Hereinbelow, it will be explained in detail.

Initial Set Up and First Discrimination Process

Step S1, S2: Firstly, the system controller section 10 detects that the tray for placing the disc D is closed from the open state, and that the disc D is placed. Then, the system controller section 10 moves the pickup 2 to the initial position by controlling the servo-control section 5, and starts the set up (SET UP) process. Here, the initial position is the position decided by the detection switch (not illustrated). Generally, this position is set in a hardware manner, such that it may become near the boundary of the lead in area and the program area of the disc D.

Step S3, S4, S5: Nextly, the system controller section 10 checks the focusing by use of the signal from the servo-control section 5. If it is in the state where the focus is not settled, the flow goes back to the step 2, and, the system controller section 10 performs the positioning to the initial position again, so as to start the set up, and re-check focusing. If the focus is not still settled, the system controller section 10 judges that it is a poor disc (it is referred as "NG disc", hereinbelow,), and terminates the process. The NG disc to be discriminated here, is, for example, an optical disc, which is scratched or dust-attached, or which is set upside down.

Step S6, S7: If focusing is normal, the system controller section 10 further checks whether the number of rotations of the spindle motor 1 is correctly servo-controlled by the signal from the servo-control section 5. If it is normal, the system controller section 10 judges that the reproduced disc D is a normal CD. And, the system controller section 10 performs the reading process of the TOC, and performs the usual operation in the same manner as the conventional cases.

Step S8, S9, S10: If the number of rotations of the spindle motor 1 is not normal, the system controller section 10 waits for 2 seconds. If the abnormal state continues for 2 seconds, the optical disc is discriminated as an optical disc which TOC cannot be read. In this case, the system controller section 10 checks nextly whether the PLAY segment (it is not illustrated) is lighted or not (the existence of the input of the PLAY key). If it is not lighted, the system controller section 10 judges that it is the defect of the number of rotations (GFS-NG) for the time being, and terminates the process, without judging the disc.

According to the processes up to this stage, when the blank CD-R or the partial CD-R is set, the set up at the initial position cannot be performed, since the lead in area is in the mirror surface finished state. However, in the present embodiment, in case that the disc is set and the PLAY key is pressed, the process shown in FIG. 5 is successively performed so as to try the reproduction. Namely, it is the second set up and the second discrimination process to be performed in case that the initial set up cannot be performed, and that the PLAY key is pushed to indicate the reproduction, as following.

Second Set up and Second Discrimination Process

Step S11, S12: When the PLAY segment (not illustrated) is lighted (i.e. when there exists the input by the PLAY key), the system controller section 10 controls the servo-control section 5, so as to once turn off the servo-control. The system controller section 10 moves the pickup 2 in the direction toward the outer circumference for a predetermined time period. When the movement is completed, the system controller section 10 starts the set up at the position. The movement time in this case is time sufficient for the reading position of the pickup 2 to be positioned in the program area of the disc by the CD standard.

Step S13, S14, S15: Nextly, the system controller section 10 checks the focusing, by use of the signal from the servo-control section 5. If it is in the state where the focus is not settled, the flow goes back to the step S12, and the system controller section 10 starts the set up again, so as to re-check the focusing. If the focus is not still settled, the system controller section 10 judges that it is the NG disc, and finishes the process.

Step S16, S17, S18: If the focusing is normal, the system controller section 10 further checks whether the number of rotations of the spindle motor 1 is normally servo-controlled or not by use of the signal from the servo-control section 5. The detection of the rotation number here, is performed by detecting whether the signal corresponding to the pit length of the disc surface is normal (3T to 11T) or not, in the servo LSI, which constitutes the servo-control section 5. In case that the number of rotations is not normal, the system controller section 10 waits for 3 seconds, which is the time to wait for the stabilization of the rotation. And, if the abnormal state continues for 3 seconds, the system controller section 10 judges that it is the NG disc (blank CD-R), and finishes the process.

Step S19: If the number of rotations of the spindle motor 1 is normal, the system controller section 10 judges that the reproduced disc D is the partial CD-R, and moves the pickup 2 by 10 tracks at a time one after another toward the inner circumference. And, the system controller section 10 obtains the channel Q data of the sub-code from the decoder section 7, and search the position of the time "00:00" of the first music, or the position of the index "0" of the first music. After this, the system controller section 10 finishes the movement.

By the above explained steps, the preparation for reproducing the program area of the partial CD-R, is completed, even if the partial CD-R is set. The reproduction process to be successively performed, will be explained with referring to the flow chart of FIG. 6.

Reproduction Process of Partial CD-R

Step S20, S21, S22: The system controller section 10 starts the usual reproduction. The system controller section 10 gets and stores the channel Q data of the sub-code read in reproduction from the decoder section 7. At the same time, the system controller section 10 compares the channel Q data of this presently read sub-code, with the channel Q data obtained at the last time. It is judged, by this comparison, whether the previous data is greater than the present data as for the absolute time information which is the recording position information. If the present absolute time information is greater, the system controller section 10 judges that it is normal. Successively, the system controller section 10 judges whether the number of rotations is normal or not, by use of the signal from the servo-control section 5. If it is normal, the system controller section 10 continues the reproduction. If it is not normal, the system controller section 10 waits for 2 seconds. If the abnormal state continues for 2 seconds, the system controller section 10 judges that the abnormal state in reproduction occurs, and the flow goes to the step S25.

Step S23, S24: If the previous data is greater than the present data in the comparison of the channel Q data, the system controller section 10 judges that it is the abnormal state in reproduction. And, the system controller section 10 jumps the pickup 2 by 10 tracks (10 Tr JUMP FWD) toward the outer circumference, and moves the reading position by controlling the servo-control section 5. And, the system controller section 10 judges whether the number of rotations is normal or not, at the position after the movement. If it is normal, the system controller section 10 judges that it is the abnormal state in reproduction due to a crack, a dust etc., and continues the reproduction without processing. If the number of rotations is not normal, the system controller section 10 judges that it is the end of the program area.

Step S25, S26: Nextly, the system controller section 10 jumps the pickup 2 by 100 tracks (100 Tr JUMP REV) toward the inner circumference, and moves the reading position. And, the system controller section 10 judges whether the number of rotations is normal or not, at the position after the movement. If it is normal, the system controller section 10 finishes the reproduction by a normal stop operation. The normal stop operation is a stop operation to stop by applying brake with respect to the rotation. If the rotation is not normal at the position after the movement toward the inner circumference, the system controller section 10 finishes the reproduction by a NG stop operation. The NG stop operation is a stop operation to turn off the servo-control, and reject the key input for 10 seconds until the number of rotations falls down, without performing other operations.

In this manner, in the CD player of the present embodiment, such a control is performed that moves the reading position of the pickup 2 to be positioned in the program area, if the set up cannot be performed at the initial position of the pickup 2 upon starting, i.e. if the rotation number of the pickup 2 is not normal, so that the discrimination of the disc is performed by use of the focus and the rotation number of the disc, in the second discrimination process by performing the second set up process. Accordingly, the discrimination of the partial CD-R can be performed and the information in the program area thereof can be reproduced by a mere change in control without adding any mechanical element.

In addition, the operation with respect to the PLAY key input after judging that it is the NG disc, is begun from the initial set up after the tray closing from the step S2, so that the disc judgement is performed again.

Further, in the above mentioned embodiment, the CD player for reproducing the CD and the partial CD-R, has been explained, but the present invention is not limited to this. Namely, the present invention is adapted to a reproducing apparatus to reproduce an optical disc, to which the information is not recorded at the reading position, so that the reproducing apparatus always enables the set up normally, even in the case that the reading position of the disc is out of the program area upon starting.

As described above, according to the optical disc reproducing apparatus of the present invention, even with respect to an optical disc which reading position upon starting consists of a mirror surface portion, since the discrimination is performed by use of the focus and the rotation number of the disc, the optical disc can be discriminated, which program area can be reproduced, by a mere change in control. For example, the partial CD-R can be easily reproduced without adding a mechanism to detect the wobbling frequency of the guiding groove in the CD player.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An optical disc reproducing apparatus for reproducing an optical disc having an information recording surface on which record information and control information are recorded, said apparatus comprising:
    means for rotationally driving the optical disc;
    a reading means for forming a light spot on the information recording surface, and receiving a reflected light to generate a read signal of the reflected light;
    means for reproducing the record information and the control information from the read signal;
    means for detecting whether a focus of the light spot is normal or not according to the read signal;
    means for detecting whether a rotation number of the optical disc is normal or not according to the read signal; and
    means for discriminating whether the optical disc is a partial optical disk recordable or not on the basis of conditions of the detected focus and the detected rotation number.

2. An apparatus according to claim 1, wherein said reading means comprises:
    an optical pickup for irradiating a laser beam, and generating a RF signal;
    a servo-mechanism for moving and positioning the optical pickup in a radial direction of the optical disc; and
    an automatic power controller for controlling an output power of the laser beam.

3. An apparatus according to claim 1, wherein said reproducing means comprises a pre-amplifier, a decoder and a D/A convertor.

4. An apparatus according to claim 1, further comprising means for controlling the driving means, the reading means and the reproducing means to operate a reproduction operation corresponding to the discriminated optical disc.

5. An apparatus according to claim 4, wherein said discriminating means and said controlling means comprise a system controller including a microprocessor and a memory.

6. An apparatus according to claim 4, wherein said controlling means is adapted to control said reading means to move a reading position thereof to a predetermined initial reading position of said optical disc upon starting a set-up process, and said focus detecting means is adapted to detect the focus at the initial reading position.

7. An apparatus according to claim 6, wherein said controlling means is adapted to perform the set-up process again when said focus detecting means detects an abnormal condition of the focus.

8. An apparatus according to claim 4, wherein said controlling means is adapted to control the reading means to move a reading position thereof to an inner circumference of the optical disc if the focus detecting means and the rotation number detecting means detect normal conditions, and start the reproduction operation of the record information from the inner circumference toward an outer circumference of the optical disc.

9. An apparatus according to claim 1, wherein said rotation number detecting means is adapted to detect the rotation number after the focus detecting means detects a normal condition of the focus.

10. An apparatus according to claim 9, wherein said focus detecting means is adapted to detect the focus again when said rotation number detecting means detects an abnormal condition of the rotation number for a predetermined time period.

11. An apparatus according to claim 1, wherein said partial optical disc recordable is a partial compact disc recordable.

12. An apparatus according to claim 1, wherein said discriminating means discriminates whether the optical disc is the partial optical disc recordable, a blank optical disc recordable, or a finalized optical disc recordable on the basis of conditions of the detected focus and the detected rotation number.

13. An apparatus according to claim 12, wherein said partial optical disc recordable is a partial compact disc recordable.

* * * * *